(12) United States Patent
Taneda

(10) Patent No.: US 9,682,728 B2
(45) Date of Patent: Jun. 20, 2017

(54) VEHICLE BODY FRONT STRUCTURE

(71) Applicant: SUZUKI MOTOR CORPORATION, Hamamatsu (JP)

(72) Inventor: Kodai Taneda, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 14/937,413

(22) Filed: Nov. 10, 2015

(65) Prior Publication Data

US 2016/0137230 A1 May 19, 2016

(30) Foreign Application Priority Data

Nov. 17, 2014 (JP) .................................. 2014-232687

(51) Int. Cl.
  *B60R 19/02* (2006.01)
  *B62D 25/08* (2006.01)
  *G01S 13/93* (2006.01)
  *G01S 7/02* (2006.01)

(52) U.S. Cl.
  CPC ............ *B62D 25/085* (2013.01); *B60R 19/02* (2013.01); *G01S 7/02* (2013.01); *G01S 13/931* (2013.01); *G01S 2007/027* (2013.01); *G01S 2013/9371* (2013.01); *G01S 2013/9375* (2013.01); *G01S 2013/9389* (2013.01)

(58) Field of Classification Search
  CPC ....... B62D 25/085; G01S 7/02; G01S 13/931; G01S 2013/9371; G01S 2013/9389; B60R 19/02

USPC ...................................................... 296/187.09
See application file for complete search history.

(56) References Cited

U.S. PATENT DOCUMENTS

| 6,340,142 | B1 * | 1/2002 | Li ............................ F16L 3/08 248/313 |
| 7,110,324 | B2 * | 9/2006 | Ho ........................ B60R 19/483 340/435 |
| 7,705,771 | B2 * | 4/2010 | Kato ........................ G01S 7/35 342/175 |
| 8,744,743 | B2 * | 6/2014 | Kawasaki ............. B60R 19/483 180/68.1 |

(Continued)

FOREIGN PATENT DOCUMENTS

| DE | WO 2011141210 A1 * | 11/2011 | ............. G01S 7/032 |
| JP | 2007030535 | 2/2007 | |
| JP | 2009287950 A | * 12/2009 | |

*Primary Examiner* — Pinel Romain
(74) *Attorney, Agent, or Firm* — Silicon Valley Patent Group LLP

(57) ABSTRACT

A vehicle body front structure comprises a radar bracket disposed between a bumper member and a hood lock member. The radar bracket includes an upright portion to which a radar unit is fixed and oblique portions that are continuous with an upper end of the upright portion and extend toward a vehicle rear side and upward, and a space is formed under the oblique portions on a rear side with respect to the upright portion. At a boundary between the upright portion and the oblique portions, first deformation portions are formed that facilitate deformation at this boundary, and at attachment positions of the oblique portions at which the oblique portions are attached to the hood lock member, second deformation portions are formed that facilitate deformation at these attachment positions.

20 Claims, 9 Drawing Sheets

(56) References Cited

U.S. PATENT DOCUMENTS

| | | | | |
|---|---|---|---|---|
| 8,833,815 B2* | 9/2014 | Aleem | ................. | B60R 19/483 |
| | | | | 293/102 |
| 9,221,859 B2* | 12/2015 | Withers | ................. | C07H 13/04 |
| 2011/0042975 A1* | 2/2011 | Faruque | ................. | B60R 19/28 |
| | | | | 293/118 |
| 2014/0313067 A1* | 10/2014 | Hsiao | ..................... | G01S 13/42 |
| | | | | 342/27 |
| 2015/0035317 A1* | 2/2015 | Aitharaju | ............. | B62D 25/163 |
| | | | | 296/187.03 |
| 2015/0191145 A1* | 7/2015 | Farooq | ................... | B60R 21/38 |
| | | | | 180/274 |

\* cited by examiner

VEHICLE BODY FRONT STRUCTURE

CROSS-REFERENCE TO RELATED APPLICATION

This application is based upon and claims the benefit of priority from the prior Japanese Patent Application No. 2014-232687, filed on Nov. 17, 2014, the entire contents of which are incorporated herein by reference.

FIELD

The present invention relates to a vehicle body front structure comprising a radar unit.

BACKGROUND

In recent years, an object detection device such as an ACC (Adaptive Cruise Control System) millimeter-wave radar unit that detects the presence or absence of an object in a traveling direction of a vehicle, a relative distance between vehicles, and the like has been mounted in the vehicle body front portion of vehicles such as automobiles. Such a radar unit is mounted on a vehicle rear side with respect to a front bumper, and a radar detection area of the radar unit radially extends from there toward a front side with respect to the vehicle body. Strict conditions are required for radio wave transmission in the detection area.

However, when the radar unit is mounted on the vehicle rear side with respect to the front bumper, the radar unit is often disposed near the front bumper in order to easily detect obstacles on the front side with respect to the front bumper and prevent the radar detection area from being too wide.

In this case, the radar unit is firmly fixed to the vehicle body in order to improve the object detection accuracy. However, the radar unit has a high rigidity. If such a component having a high rigidity is disposed right behind the front bumper, when a collision object such as a pedestrian collides against the vehicle body from the front side with respect to the vehicle, a large impact is applied to the pedestrian. Therefore, an attachment structure for protecting a pedestrian is known as disclosed in Japanese Patent Laid-open Publication No. JP 2007-30535A, for example. In Japanese Patent Laid-open Publication No. JP 2007-30535A, an attachment portion of a radar unit is caused to drop off upon collision from the front side to move back the radar unit toward the vehicle rear side, and thus the impact applied to the pedestrian is reduced.

However, in the conventional attachment structure disclosed in Japanese Patent Laid-open Publication No. JP 2007-30535A, there is a problem in that a large number of components for attaching the radar unit are required. Moreover, since the attachment structure disclosed in Japanese Patent Laid-open Publication No. JP 2007-30535A copes only with collisions from the front side with respect to a vehicle, there is the problem that the radar unit cannot move back upon collision from diagonally above, for example.

In view of the foregoing problems, it is an object of the present invention to provide a vehicle body front structure with which a radar unit can move back and an impact applied to a collision object can be reduced upon collision not only from the front side with respect to a vehicle but also from diagonally above.

SUMMARY OF THE DISCLOSURE

In order to solve the foregoing problems, the present invention is directed to a vehicle body front structure comprising a radar unit, and the vehicle body front structure further comprises a bumper member that extends in a vehicle width direction on a rear side with respect to a front bumper and supports the front bumper, a hood lock member that is provided parallel to the bumper member on a vehicle rear side with respect to the bumper member above the bumper member, a hood lock being attached to the hood lock member, and a radar bracket that is disposed between the bumper member and the hood lock member, the radar unit being fixed to the radar bracket, wherein the radar bracket includes an upright portion that is attached to the bumper member and extends upward from the bumper member, the radar unit being fixed to the upright portion, an oblique portion that is continuous with an upper end of the upright portion, extends toward a vehicle rear side and upward, and is attached to the hood lock member, a first deformation portion that is formed at a boundary between the upright portion and the oblique portion and facilitates a change in an angle between the upright portion and the oblique portion, and a second deformation portion that is formed at a position of the oblique portion at which the oblique portion is attached to the hood lock member and facilitates a change in a direction in which the oblique portion extends from the hood lock member, and wherein a space that can accommodate at least a portion of the radar unit is formed under the oblique portion on a rear side with respect to the upright portion.

With the present invention, the radar bracket provided with the oblique portion in which the deformation portions are formed is disposed between the bumper member and the hood lock member, thus making it possible to form the space under the oblique portion on the vehicle rear side with respect to the upright portion. When an impact is applied from the front side with respect to the vehicle or diagonally above the vehicle, the oblique portion is inclined toward the vehicle rear side and lower side around the first deformation portion and the second deformation portion as starting points. At this time, the radar unit can move back toward the vehicle rear side and lower side and at least a portion of the radar unit can be accommodated in the above-noted space, thus making it possible to smoothly incline the oblique portion of the radar bracket and to reduce the impact applied to a collision object. In particular, since the radar bracket is provided with the oblique portion, not only the impact from the front side with respect to the vehicle but also the impact from diagonally above the vehicle can be absorbed by the oblique portion.

It is preferable that the radar bracket further includes, a third deformation portion that is formed at a boundary between the bumper member and the upright portion and that facilitates a change in a direction in which the upright portion extends from the bumper member, and a fourth deformation portion that is formed at a boundary between the upright portion and the radar unit and that facilitates deformation of the upright portion near the radar unit.

Since the deformation portions are formed at the boundary between the bumper member and the upright portion and the boundary between the upright portion and the radar unit in this manner, the radar unit can easily move back to the further rear and lower sides when the impact is applied from the front side with respect to the vehicle or diagonally above the vehicle.

It is preferable that the upright portion includes a shaft portion extending in a vertical direction and a lateral portion extending from an upper end of the shaft portion in a vehicle width direction, the upright portion having a T shape when viewed from a vehicle front side, wherein the oblique portion includes a first oblique portion extending toward a vehicle rear side and a vehicle upper side from one end of the lateral portion and a second oblique portion extending toward a vehicle rear side and a vehicle upper side from an opposite end of the lateral portion, and wherein the hood lock of the hood lock member is located between the first oblique portion and the second oblique portion above the radar unit.

Since the hood lock is provided in this manner, it is possible to prevent the collision of the hood lock and the radar unit when the radar bracket is inclined toward the vehicle rear side and lower side.

It is preferable that the radar unit includes a radar unit body and an autobrake bracket for attaching the radar unit body to the radar bracket, wherein the autobrake bracket is fixed to the lateral portion at a first fixing point and a second fixing point, and wherein the first fixing point is provided on a central vertical line of a boundary between the first oblique portion and the lateral portion and the second fixing point is provided on a central vertical line of a boundary between the second oblique portion and the lateral portion.

By doing this, the positions in the vehicle width direction of the fixing points can be located at the centers of the boundaries between the oblique portions and the lateral portion, and the impact loads applied to the radar unit during impact application can be equally divided in the vehicle width direction and transmitted to the first oblique portion and the second oblique portion.

It is preferable that at least one of the first deformation portion and the second deformation portion is a notch, and that at least one of the third deformation portion and the fourth deformation portion is a notch. A notch can be formed simultaneously with the radar bracket, and therefore, when the deformation portion is a notch, it is possible to improve the processing formability of sheet metal members.

It is preferable that the vehicle body front structure further comprises a surrounding member that is provided near the upright portion, and that the surrounding member includes side walls that face both side surfaces of the upright portion, respectively. Accordingly, when the impact is applied in the diagonal direction, the radar bracket can be inclined only toward the vehicle rear side and lower side, which are target sides, without being shifted in the vehicle width direction.

It is preferable that the surrounding member is a shroud that introduces headwind to a radiator, and that the side walls have a bent portion that covers at least one corner of the radar unit. Since the bent portion can support the corner of the radar unit, it is possible to further prevent the radar bracket from being shifted in the vehicle width direction when the impact is applied in the diagonal direction.

With the present invention, it is possible to provide a vehicle body front structure with which a radar unit can move back and an impact applied to a collision object can be reduced upon collision not only from the front side with respect to a vehicle but also from diagonally above a vehicle.

DETAILED DESCRIPTION

Figure 1:
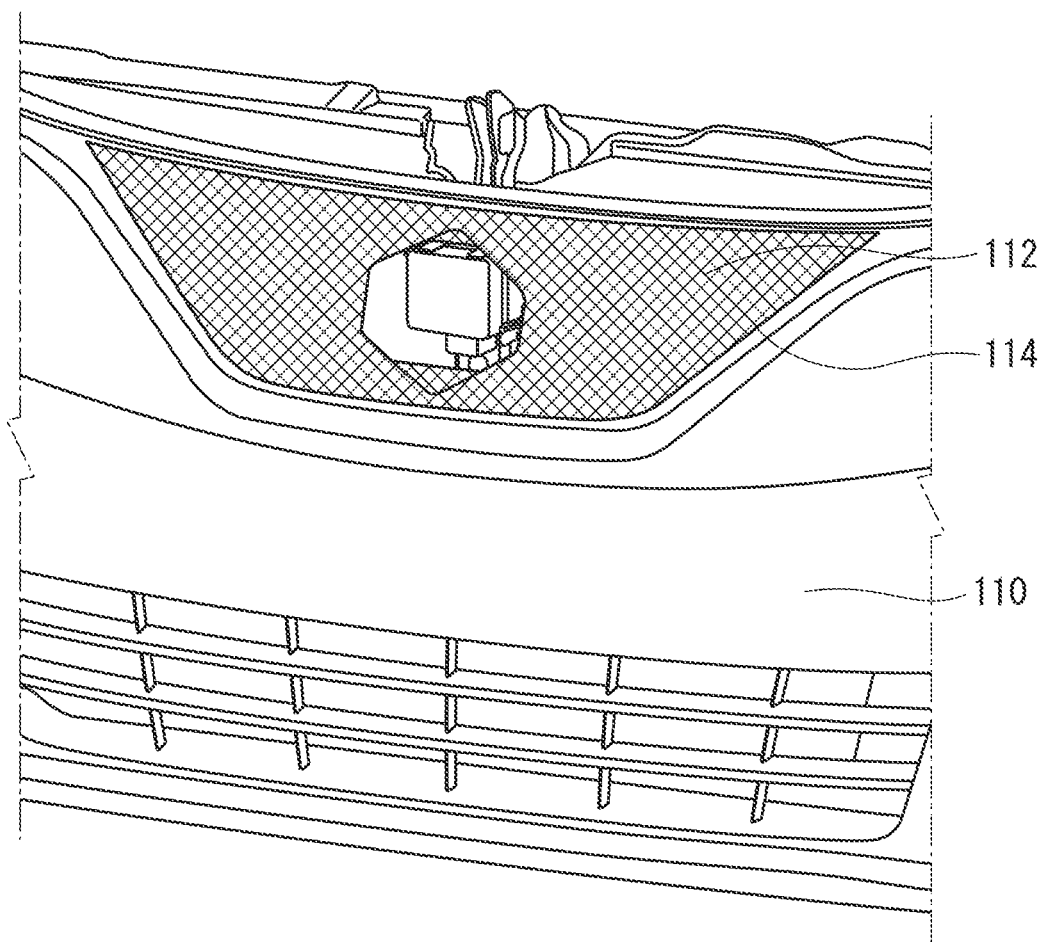
FIG. 1 is an enlarged view of the front surface of a vehicle in which a vehicle body front structure according to one embodiment is used.

Hereinafter, a preferred embodiment of the present invention will be described in detail with reference to the accompanying drawings. The dimensions, materials, and other specific numerical values described in this embodiment are merely examples for facilitating the understanding of the present invention, and are not to be construed as limiting the invention unless otherwise stated. It should be noted that elements constituting substantially identical functions and configurations are denoted by identical reference numerals in the present specification and the drawings, and hence redundant description has been omitted. Also, illustration of elements that are not directly relevant to the present invention has been omitted.

Figure 2:
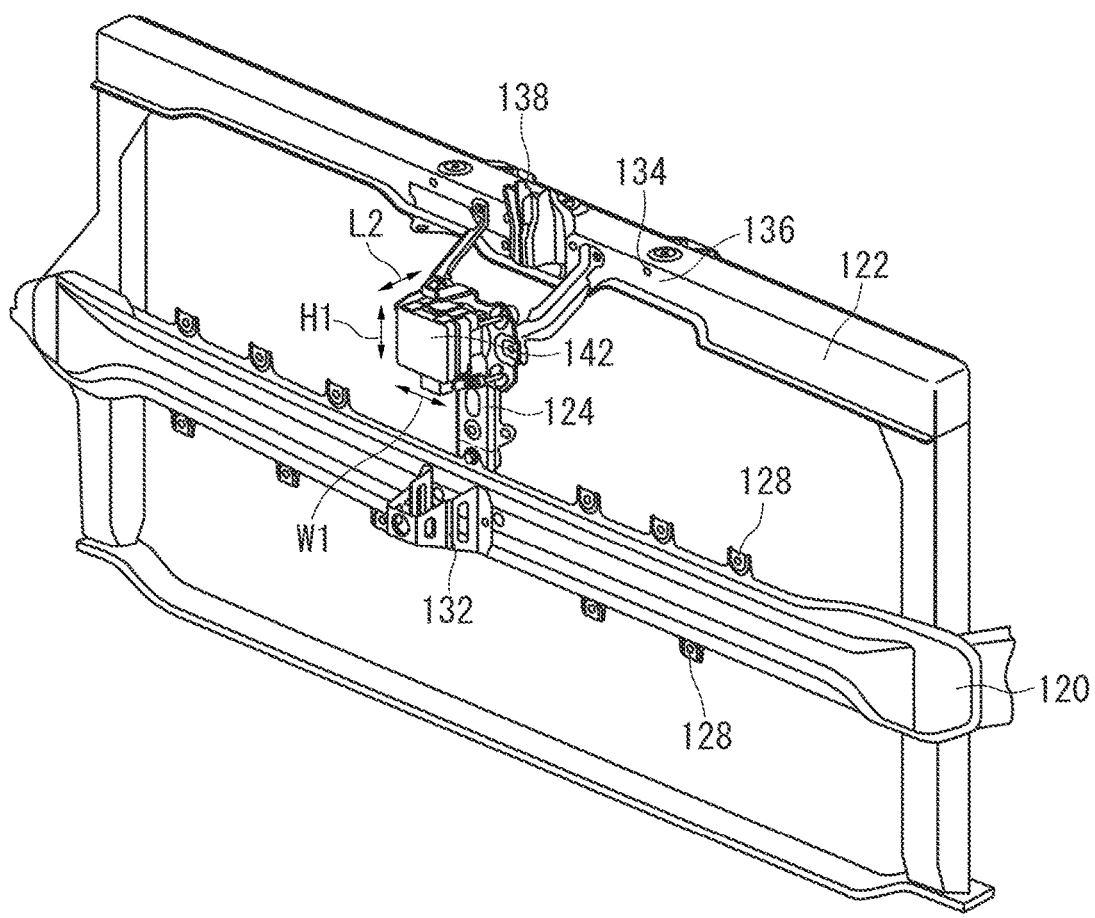
FIG. 2 is a perspective view illustrating a state in which a front bumper and a front grill are removed from the vehicle in FIG. 1.

FIG. 1 is an enlarged view of the front surface of a vehicle in which a vehicle body front structure according to this embodiment is used. FIG. 2 is a perspective view illustrating a state in which a front bumper and a front grill are removed from the vehicle in FIG. 1.

As shown in FIG. 1, a front bumper 110 is provided on the front most side of the vehicle front surface. Headlights and the like (not shown) are provided on both the left and right sides in the vehicle width direction of the front bumper 110. It should be noted that a skeleton of the vehicle body front structure is formed by joining a plurality of vehicle body structural members. The skeleton of the vehicle body front structure described below is merely an example for facilitating the understanding of the present invention, and the present invention is not limited to this.

A front grill 112 is provided above the front bumper 110, and the front grill 112 is provided with a plurality of small holes 114. These holes 114 are outside air inlets through which air (outside air) for cooling a radiator used to cool an engine (not shown) is taken in.

FIG. 2 is a perspective view illustrating a state in which the front bumper 110 and the front grill 112 are removed from the vehicle in FIG. 1. As shown in FIG. 2, a bumper member 120, a hood lock member 122, a radar bracket 124 and the like are provided inside with respect to the positions from which the front bumper 110, the front grill 112 and the like has been removed. The bumper member 120 and the hood lock member 122 extend parallel to each other in the vehicle width direction. The hood lock member 122 is provided on the diagonally upper rear side with respect to the bumper member 120.

The bumper member 120 is made of metal, for example, has a U-shaped cross section (see FIG. 6), and includes a plurality of attachment portions 128 that extend in the vertical direction from suitable positions at its upper and lower edges. Each attachment portion 128 is provided with a through hole 130, for example, and a predetermined member is attached thereto via the through hole 130. A supporting portion 132 is provided at the center of the bumper member 120 (the center in the vertical direction and the vehicle width direction of the bumper member 120), and supports the front bumper 110 at its center (the center in the vertical direction and the vehicle width direction of the front bumper 110). The hood lock member 122 is provided parallel to the bumper member 120 on the vehicle rear side with respect to the bumper member 120 above the bumper member 120.

The hood lock member 122 is made of metal, for example, is also called an upper cross member, and constitutes a front portion of an upper edge of an engine room. Similarly to the bumper member 120, the hood lock member 122 also includes a plurality of attachment portions 136 provided with a through hole 134 at predetermined positions, and a predetermined member is attached to the attachment portion 136. In FIG. 2, for example, a hood lock 138 that is a member for fixing an engine hood to a vehicle body is provided at substantially the center of the hood lock member 122. A radiator or the like for cooling an engine, which is not shown in the drawings, is also fixed to the hood lock member 122.

The radar bracket 124 is provided between the bumper member 120 and the hood lock member 122. The radar bracket 124 is disposed between the bumper member 120 and the hood lock member 122 at the center in the vehicle width direction. An ACC millimeter-wave radar unit 142 (referred to as "radar unit" hereinafter) is fixed to the radar bracket 124.

FIGS. 3A to 3D are diagrams illustrating the radar bracket in FIG. 2 in detail. In FIGS. 3A to 3D, FIGS. 3A to 3D are a front view, a side view, a perspective view and a top view of the radar bracket, respectively. FIG. 4 is a diagram illustrating a state in which the radar bracket shown in FIG. 3 is disposed between the bumper member and the hood lock member.

As shown in FIGS. 3A to 3D, the radar bracket 124 is a metal sheet member, and has an upright portion 150 and two oblique portions, that is, a first oblique portion 152 and a second oblique portion 154. The upright portion 150 supports the radar unit 142 (FIG. 2) at a predetermined height, and has a T shape including a shaft portion 160 and a lateral portion 162, as viewed from the vehicle front side.

Figure 3A:
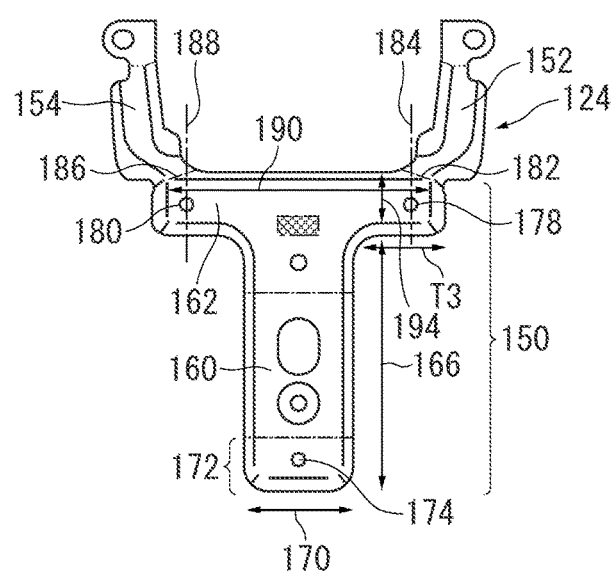
FIGS. 3A to 3D are diagrams illustrating a radar bracket in FIG. 2 in detail.
Figure 3B:
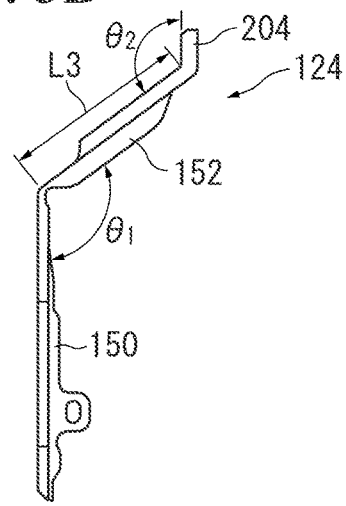
Figure 4:
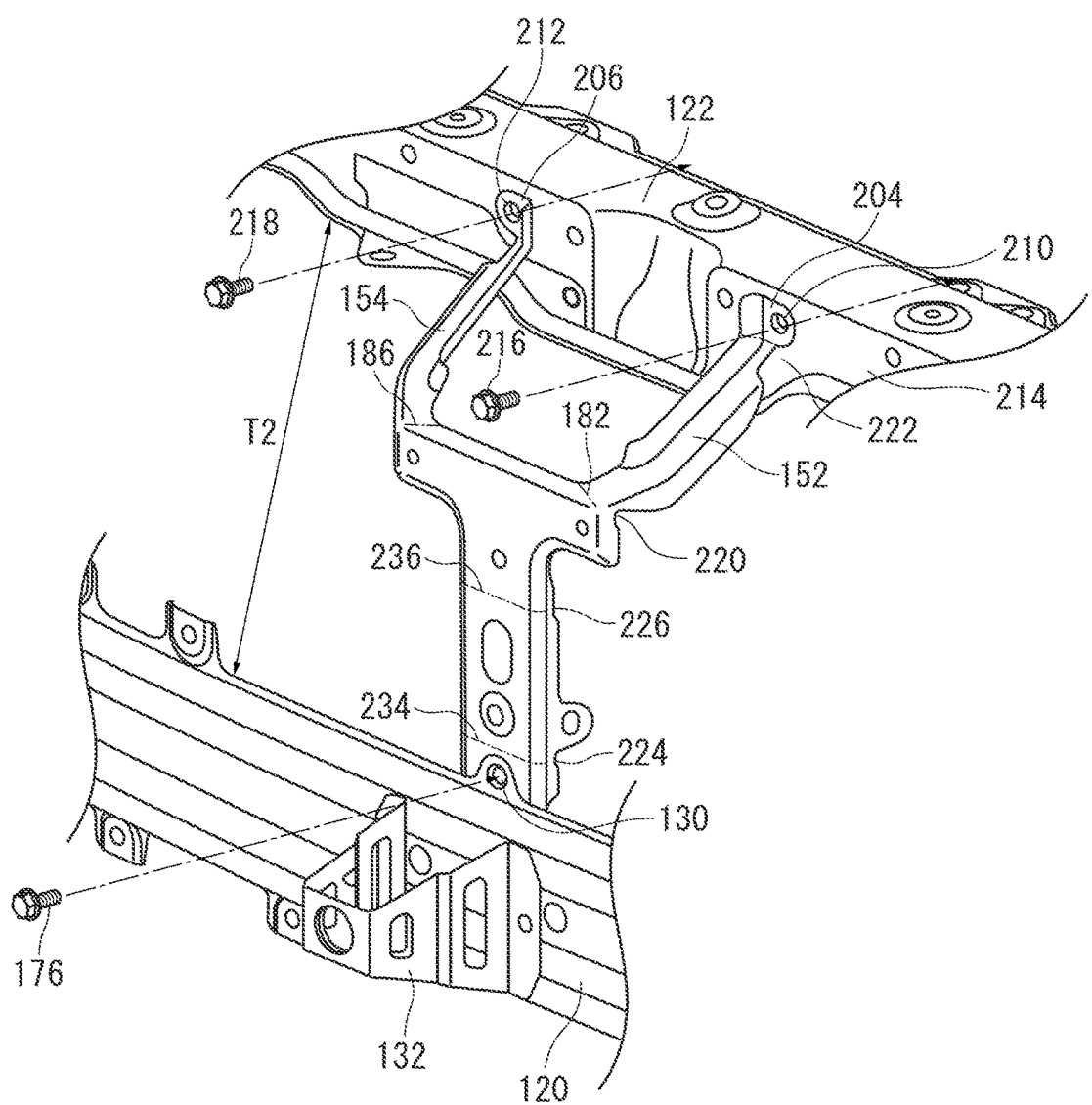
FIG. 4 is a diagram illustrating a state in which the radar bracket shown in FIG. 3 is disposed between a bumper member and a hood lock member.

As shown in FIG. 3A, the shaft portion 160 has a longitudinal rectangular shape, as viewed from the vehicle front side, that is, from its front side, and the length of its long side 166 is equal to or longer than the height H1 (FIG. 2) of the radar unit 142. Its short side 170 may have any length as long as the shaft portion 160 can support the radar unit 142. In the present invention, as noted later, when an impact is applied from the front side with respect to the vehicle or diagonally above the vehicle, the radar bracket 124 is bent toward the rear side or the lower side. Therefore, it is preferable that the short side 170 of the shaft portion 160 is shorter. The length of the short side 170 is preferably shorter than or equal to the width W1 (FIG. 2) of the radar unit 142, and more preferably a half or shorter than the width W1 of the radar unit 142.

The lower end of the shaft portion 160 serves as a lower attachment portion 172 to be fixed to the bumper member 120. The lower attachment portion 172 is a portion for attaching the radar bracket 124 to the bumper member 120, and has a through hole 174. As shown in FIG. 4, the through hole 174 corresponds to the through hole 130 of the attachment portion 128 located above the center of the bumper member 120. Accordingly, the radar bracket 124 is fixed to the bumper member 120 using a bolt 176, for example, such that the lower attachment portion 172 overlaps the attachment portion 128 located above the center of the bumper member 120.

Referring to FIGS. 3A to 3D again, the lateral portion 162 of the upright portion 150 is a plate-shaped lateral rod that laterally extends in the vehicle width direction at the upper end of the shaft portion 160, and has a laterally elongated rectangular shape, as viewed from the vehicle front side. The radar unit 142 is attached thereto. Accordingly, a long side 190 of the lateral portion has substantially the same length as the length in the horizontal direction of an autobrake bracket 238 (FIG. 5) to be used to attaching the radar unit 142 to the lateral portion 162. Also, as shown in FIG. 3A, the radar bracket 124 is provided with a through hole 178 serving as a first fixing point and a through hole 180 serving as a second fixing point for fixing the radar unit 142. The through holes 178 and 180 are formed at the center in the vertical direction of the lateral portion and near both the left and right end portions of the lateral portion. The through hole 178 is located on a central vertical line 184 extending in the vertical direction from the center of a first boundary 182 that is a boundary between the first oblique portion 152 and the lateral portion 162. Similarly, the through hole 180 is located on a central vertical line 188 extending in the vertical direction from the center of a second boundary 186 that is a boundary between the second oblique portion 154 and the lateral portion 162. Accordingly, loads applied to the radar unit 142 can be substantially equally divided in the width direction and transmitted to the first oblique portion 152 and the second oblique portion 154.

The length of a short side 194 of the lateral portion 162 is preferably shorter than or equal to the height H1 (FIG. 2) of the radar unit 142, and more preferably a half or shorter than the height H1 of the radar unit 142. This makes it possible to increase the length of the long side 166 of the shaft portion 160, and therefore, the shaft portion 160 can be easily bent toward the vehicle rear side or the vehicle lower side upon collision.

The first oblique portion 152 and the second oblique portion 154 extend from the right and left portions of the upper portion of the lateral portion 162, that is, from the right and left portions of the upper end of the lateral rod of the T shape, respectively. The first oblique portion 152 and the second oblique portion 154 are members that extend upward and toward the vehicle rear side from the right and left portions of the upper end of the lateral portion 162 so as to be continuous with these portions, and their end portions are fixed to the hood lock member 122 (FIG. 4). The angles θ1 of the first oblique portion 152 and the second oblique portion 154 with respect to the shaft portion 160 may be the same, and can be set as desired depending on the height of the upright portion 150 and a distance T2 (FIG. 4) between the bumper member 120 and the hood lock member 122 to which the radar bracket 124 is to be attached.

Figure 3C:
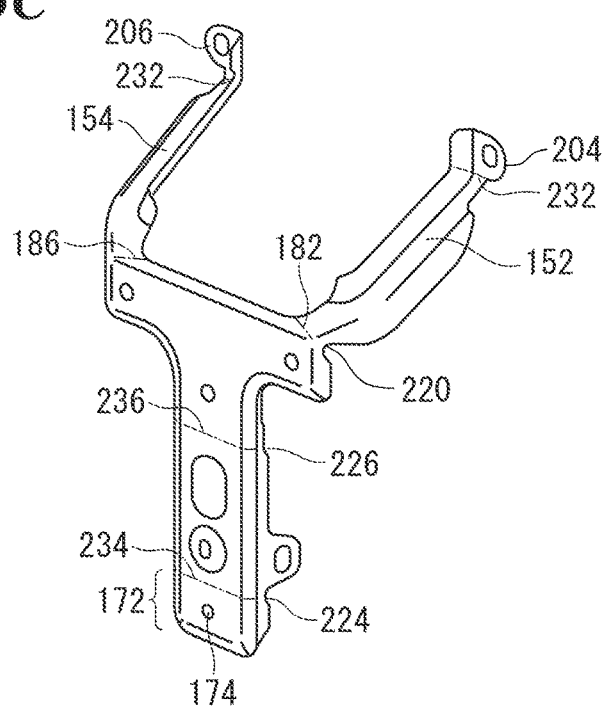
Figure 3D:
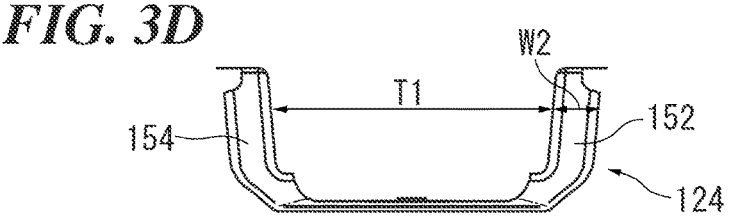

As shown in FIG. 3D, the first oblique portion 152, the second oblique portion 154, and the lateral portion 162 connected to these portions form a U shape, as viewed from the top side. At this time, the first oblique portion 152 and the second oblique portion 154 may be parallel to each other or may be formed such that a distance T1 between the first oblique portion 152 and the second oblique portion 154 increases as these portions extend away from the lateral portion.

The first oblique portion 152 and the second oblique portion 154 are longitudinal plate-shaped members, as viewed from the top side, and can be formed to have a desired width W2 and a desired length. However, as noted later, in the present invention, when an impact is applied from the front side with respect to the vehicle or diagonally above the vehicle, the first oblique portion 152 and the second oblique portion 154 need to be deformed at the boundary between these portions and the lateral portion, and the boundary between these portions and the hood lock member. Accordingly, it is preferable that the width W2 of the first oblique portion 152 and the second oblique portion 154 is not too large, and it is more preferable that the width W2 is smaller than the length T3 of a portion of the lateral portion 162 that extends from the shaft portion 160 in the vehicle width direction. It is also preferable that the lengths L3 of the first oblique portion 152 and the second oblique portion 154 are longer than the depth L2 (FIG. 2) of the radar unit 142, and it is more preferable that the lengths are at least 1.4 times or longer than the depth L2 of the radar unit 142. This makes it possible to form a space 260 (FIG. 6) having a depth of at least a half or longer than the depth L2 of the radar unit 142 on the vehicle rear side with respect to the radar unit 142.

Upper attachment portions 204 and 206 for attaching the radar bracket 124 to the hood lock member 122 are provided at the upper ends of the first oblique portion 152 and the second oblique portion 154, that is, at their end portions on the hood lock member 122 side. The upper attachment portions 204 and 206 each have a vertical surface that is parallel to the upright portion 150, and through holes 210 and 212 are formed in these surfaces. Accordingly, as shown in FIG. 4, the upper end of the radar bracket 124 is fixed using bolts 216 and 218, for example, such that the vertical surfaces of the upper attachment portions 204 and 206 overlap a vertical surface 214 of the hood lock member 122. At this time, as shown in FIG. 2, the hood lock 138 is located in a space between the first oblique portion 152 and the second oblique portion 154.

As noted later, in the present invention, when an impact is applied from the front side with respect to the vehicle or diagonally above the vehicle, the radar bracket 124 is bent toward the rear side or the lower side, and therefore, it is preferable to provide the radar bracket 124 and the radar unit 142 attached to the radar bracket 124 such that the radar bracket 124 and the radar unit 142 do not collide against the hood lock 138 when the radar bracket 124 is bent. Specifically, it is preferable to determine the height of the upright portion 150 of the radar bracket 124 (that is, the length of the long side 166 of the shaft portion 160 and the length of the short side 194 of the lateral portion 162) and the position at which the radar unit 142 is fixed such that the hood lock 138 is located above and on the rear side with respect to the radar unit 142 and the radar bracket 124 when the radar unit 142 is attached to the radar bracket 124.

Referring to FIGS. 3A to 3D again, the radar bracket 124 is provided with deformation portions. In this embodiment, as shown in FIG. 3C, the deformation portions are first to fourth notches 220, 222, 224 and 226 having a substantially semi-circular shape that are formed at the outer edge in the vehicle width direction of the radar bracket 124. The first to fourth notches 220, 222, 224 and 226 are formed to make the width or the thickness of portions of the upright portion 150 of the radar bracket 124 and the oblique portions 152 and 154 narrower or thinner than other portions, and serve as starting points around which the radar bracket 124 is bent toward the vehicle rear side or vehicle lower side when an impact is applied to the vehicle from the front side with respect to the vehicle or diagonally above the vehicle. All of the upright portion 150, the oblique portions 152 and 154, and the first to fourth notches 220, 222, 224 and 226 may be simultaneously formed by press molding or the like, for example. Alternatively, in another example, it is also possible to separately form the first to fourth notches 220, 222, 224 and 226 after forming the upright portion 150 and the oblique portions 152 and 154.

The semi-circular first to fourth notches 220, 222, 224 and 226 are formed to make portions in which the notches are formed narrower than other portions in which the notches are not formed. The notches can be formed in appropriate shapes depending on positions at which the notches are formed, and all of the notches need not be formed in the same shape. Although only the first to fourth notches 220, 222, 224 and 226 provided on one side of the radar bracket 124 are illustrated in FIG. 3C, four notches are similarly formed on the other side. Accordingly, the radar bracket 124 has eight notches in total.

The first notches 220 are respectively formed at the first boundary 182, which is a boundary between the upright portion 150 and the first oblique portion 152, and the second boundary 186, which is a boundary between the upright portion 150 and the second oblique portion 154, at the outer edges in the vehicle width direction of the radar bracket 124, and facilitate the deformation at the first boundary 182 and the second boundary 186, specifically, facilitate the change in the angles θ1 between the upright portion 150 and the oblique portions 152 and 154 at the first boundary 182 and the second boundary 186.

The second notches 222 are respectively formed at third boundaries 232 that are boundaries between the oblique portions 152 and 154 and the upper attachment portions 204 and 206 at the outer edges in the vehicle width direction of the radar bracket 124, and facilitate the change in the direction in which the oblique portions 152 and 154 extend from the hood lock member 122, specifically, facilitate the change in angles θ2 between the oblique portions 152 and 154 and the upper attachment portions 204 and 206.

The third notches 224 are formed at the outer edges in the vehicle width direction of the radar bracket 124 near the lower attachment portion 172, and facilitate the deformation near the lower attachment portion 172. Specifically, as shown in FIG. 4, the third notches 224 are formed at a fourth boundary 234 that is a boundary between the upper end of the attachment portion 128 and the radar bracket 124 when the lower attachment portion 172 is fixed to the attachment portion 128 of the bumper member 120, and make it easy to bend the upright portion 150 toward the vehicle rear side such that a mountain-like fold is formed at the fourth boundary 234, as viewed from the vehicle front side.

The fourth notches 226 are formed at the outer edges in the vehicle width direction of the radar bracket 124 at a fifth boundary 236 that is a boundary between the upright portion 150 and the radar unit 142, that is, at positions corresponding to the lower end of the radar unit 142 when the radar unit 142 is fixed to the radar bracket 124, and make it easy to bend the upright portion 150 to form a valley-like fold near the radar unit 142. It should be noted that the notches, that is, the deformation portions, need not be formed at all of the above-described positions, and the deformation portions can be formed at suitable positions depending on the material of the radar unit 142, the height of the upright portion 150, the lengths L3 of the oblique portions 152 and 154, or the magnitude of the angles θ1 and θ2. For example, the deformation portions may be formed at only the first boundary 182, the second boundary 186 and the third boundaries 232.

Additional lines such as linear slits can also be formed in the surfaces of the radar bracket 124 in addition to the first to fourth notches 220, 222, 224 and 226 to make it easier to bend the radar bracket toward the vehicle rear side or the vehicle lower side. For example, the additional lines may be formed at the fourth boundary 234 and the fifth boundary 236 to help the radar bracket 124 to be bent toward the vehicle rear side or the vehicle lower side and form a mountain-like fold or valley-like fold.

Figure 5:
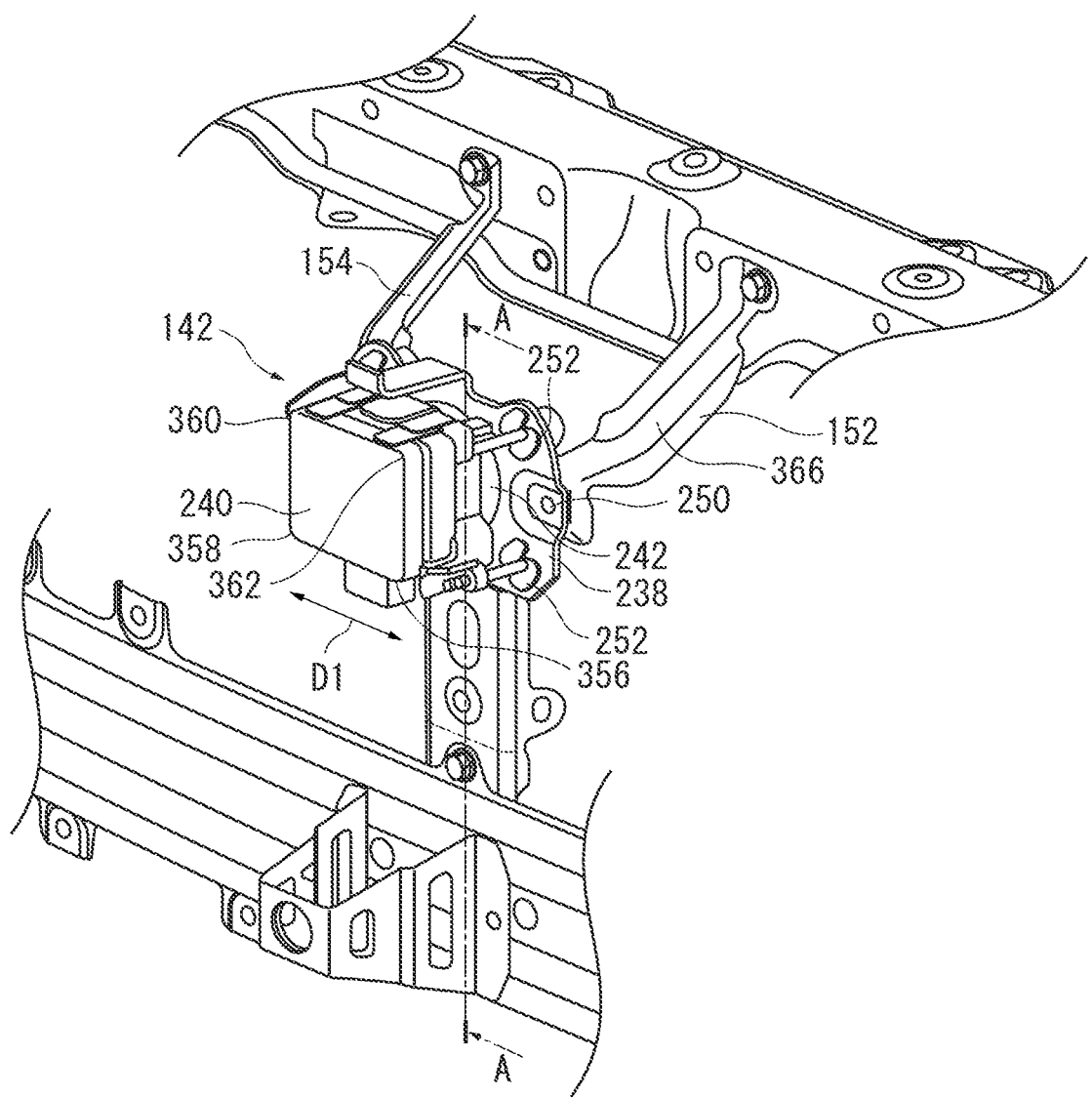
FIG. 5 is a diagram illustrating a state in which a radar unit is attached to the radar bracket shown in FIG. 4.

The radar unit 142 is fixed to the radar bracket 124 as described above via the autobrake bracket 238, for example. FIG. 5 is a diagram illustrating a state in which the radar unit 142 is attached to the radar bracket 124 shown in FIG. 4. As shown in FIG. 5, the radar unit 142 includes the autobrake bracket 238 and a radar unit body 240, and the radar unit body 240 is fixed to the lateral portion 162 of the radar bracket 124 via the autobrake bracket 238. The radar unit body 240 is a member constituting the radar unit 142 and is an object detection device that detects the presence or absence of an object in a traveling direction of the vehicle, a relative distance between vehicles, and the like. Also, the autobrake bracket 238 is a metal plate-shaped member constituting the radar unit 142, is interposed between the radar bracket 124 and the radar unit body 240, and is used to attach the radar unit body 240 to the radar bracket 124.

The autobrake bracket 238 has a substantially rectangular shape provided with a circular hole 242 at its center, and its longitudinal length and lateral length are longer than the length in the longitudinal direction and the lateral direction of the radar unit body 240, respectively. Accordingly, the autobrake bracket 238 is slightly larger than the radar unit body 240, and through holes 250 are provided at the centers in the vertical direction of its both ends. The through holes 250 overlap the through holes 178 and 180 (FIG. 3A) formed in the lateral portion 162 of the radar bracket 124, respectively, and thus the autobrake bracket 238 is fixed to the radar bracket 124 using bolts or the like (not shown) such that its lower half overlaps a portion of the shaft portion 160 of the radar bracket 124 and the lateral portion 162.

Through holes 252 for fixing the radar unit body 240 are provided at the four corners of the autobrake bracket 238. Accordingly, the radar unit body 240 is fixed to the autobrake bracket 238 using bolts or the like, for example, at positions near its four corners.

Figure 6:
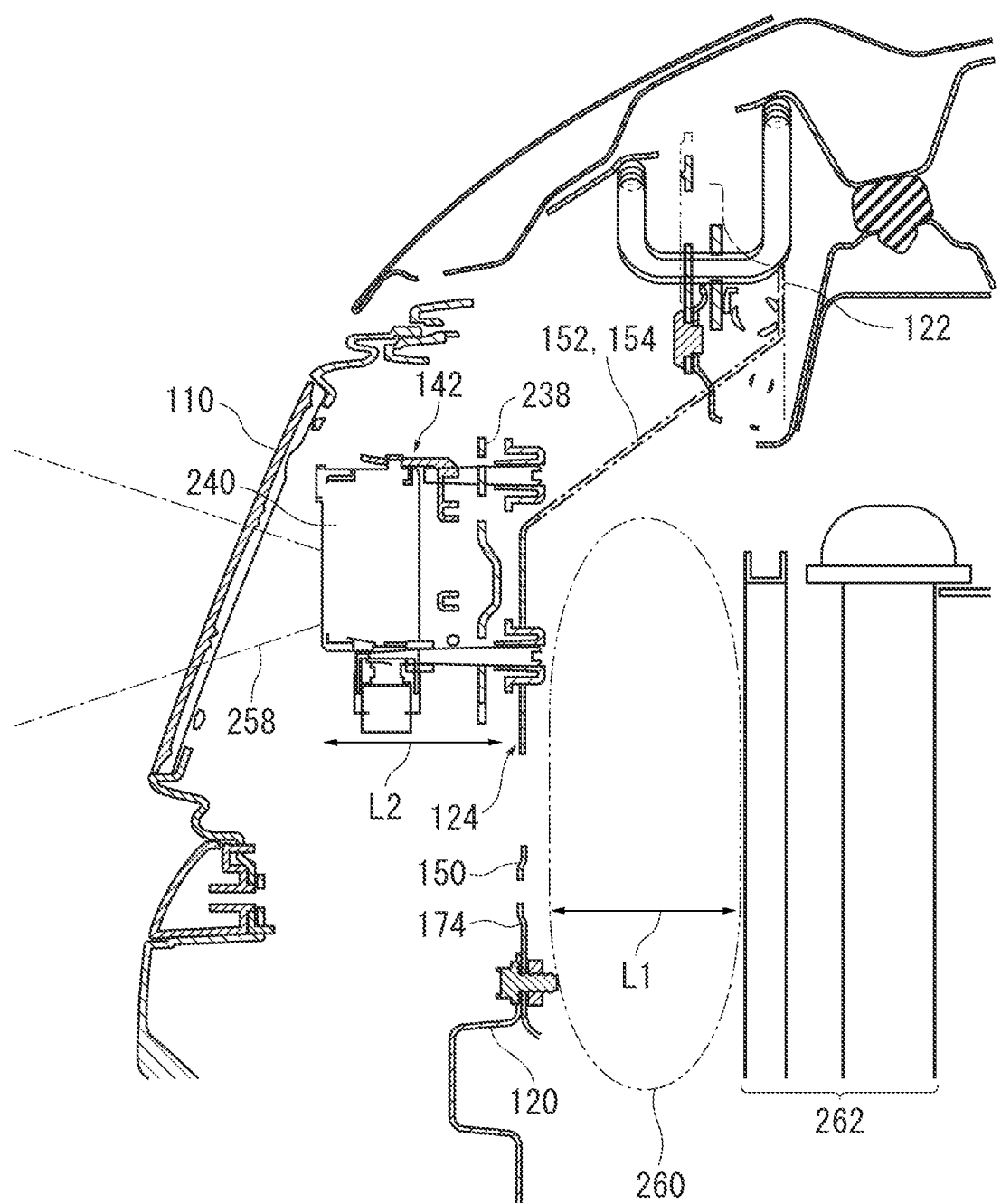
FIG. 6 is a cross-sectional view of the radar unit and the radar bracket shown in FIG. 5 taken along line A-A.

FIG. 6 is a cross-sectional view of the radar unit and the radar bracket in FIG. 5 taken along line A-A. Since the radar bracket 124 includes the sufficiently high upright portion 150 as described above, the radar unit 142 can be disposed nearby the front bumper 110. Accordingly, the radar unit provides a radio wave transmission range 258 that satisfies an appropriate radio wave transmission condition, and it is possible to prevent problems such as an increase in cost and a limitation of design caused by the radar unit 142 being disposed away from the front bumper 110.

Since the radar bracket 124 includes the oblique portions 152 and 154 extending toward the vehicle rear side and upper side, the space 260 is formed on the vehicle rear side with respect to the upright portion 150 of the radar bracket 124 below the oblique portions 152 and 154 when the radar bracket 124 is provided so as to be disposed between the bumper member 120 and the hood lock member 122 as shown in FIG. 6.

As shown in FIG. 6, the space 260 is formed between the radar bracket 124 and an onboard component 262 (a capacitor or a thermal converter such as a radiator in FIG. 6) on the rear side with respect to the upright portion 150 of the radar bracket 124 so as to extend from the oblique portions 152 and 154 of the radar bracket 124 to the lower attachment portion 172. In particular, in this embodiment, since the oblique portions 152 and 154 have a sufficient length, the depth L1 of the space 260 can be set to be substantially longer than the depth L2 of the radar unit 142.

Figure 7:
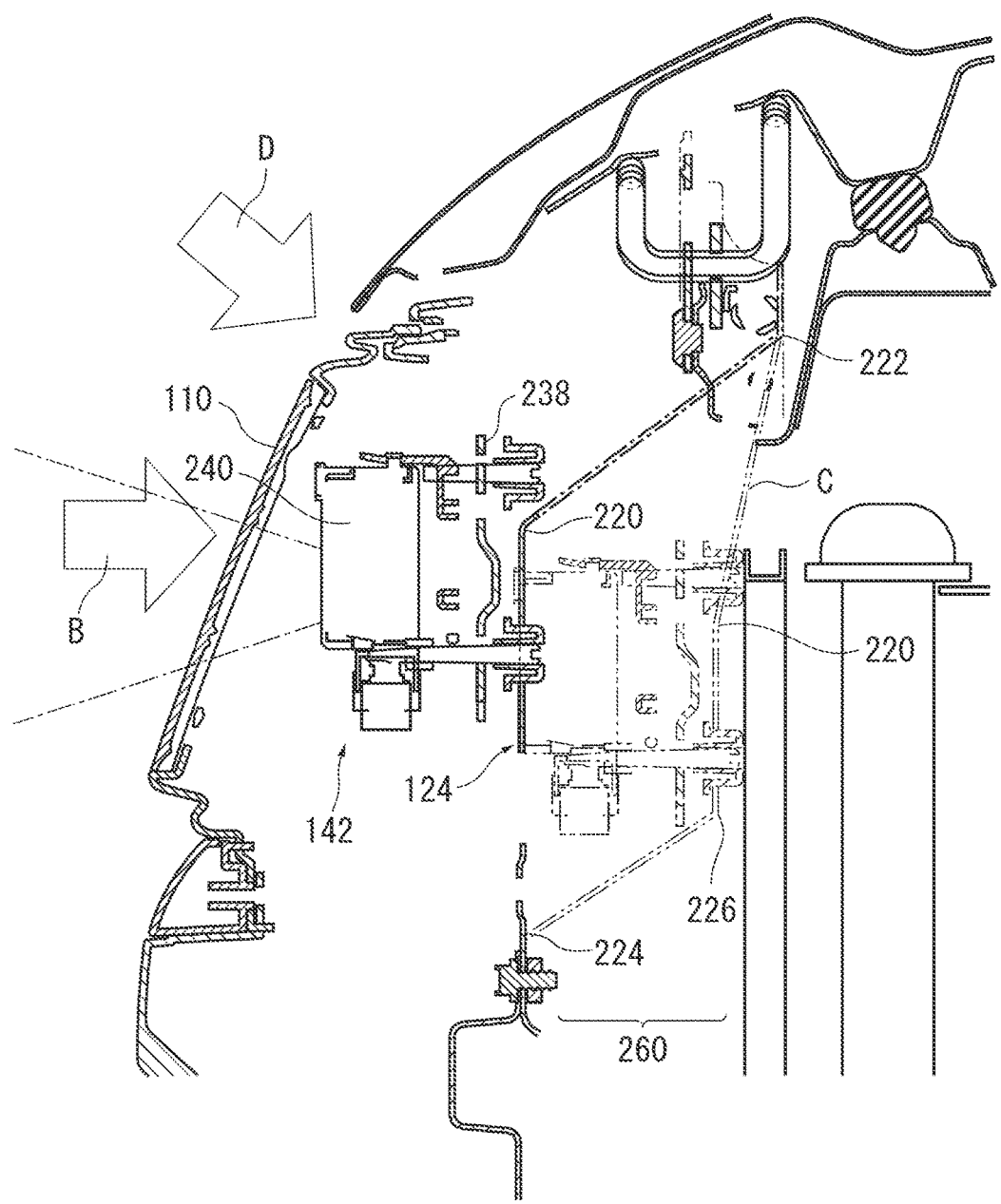
FIG. 7 is a diagram showing an example of a situation in which an impact is applied from the front side with respect to a vehicle or diagonally above a vehicle in the state in FIG. 6.

FIG. 7 is an explanatory diagram illustrating states of the radar unit and the radar bracket when an impact is applied from the front side with respect to the vehicle or diagonally above the vehicle in the state in FIG. 6. When an impact is applied from the front side with respect to the vehicle as indicated by arrow B, for example, the radar bracket 124 moves back toward the vehicle rear side and the vehicle lower sides, and enters the space 260 as shown by dotted line C in FIG. 7.

Specifically, the angles θ1 between the upright portion 150 and the oblique portions 152 and 154 at the first boundary 182 and the second boundary 186 at which the first notches 220 are formed are increased due to the first notches 220. Accordingly, the upper portion of the radar unit 142 moves toward the vehicle rear side and the vehicle lower side, and enters the space 260. Moreover, since the angles θ2 between the oblique portions 152 and 154 and the upper attachment portions 204 and 206 at the third boundaries 232 at which the second notches 222 are formed are increased due to the second notches 222, the first oblique portion 152 and the second oblique portion 154 enter the space 260 to help the upper portion of the radar unit 142 to enter the space 260.

The upright portion 150 is bent toward the vehicle rear side at the fourth boundary 234 serving as a folding line due to the third notches 224 so as to form a mountain-like fold at the fourth boundary 234, as viewed from the vehicle front side, thus helping the lower portion of the radar unit to enter the space 260. The upright portion is bent toward the vehicle rear side at the fifth boundary 236 serving as a folding line due to the fourth notches 226 so as to form a valley-like fold at the fifth boundary 236, as viewed from the vehicle front side, and thus the lower portion of the radar unit moves toward the vehicle rear side and the vehicle lower side, and enters the space 260. Since the radar unit is deformed due to the first to fourth notches in this manner, the hard radar unit 142 can move back into the space 260, thus making it possible to reduce an impact applied to the collision object.

In particular, the radar bracket 124 of the present invention includes not only the upright portion 150 but also the first and second oblique portions 152 and 154. Accordingly, when an impact is applied from diagonally above the vehicle as indicated by arrow D, for example, the first and second oblique portions 152 and 154 can also be deformed toward the vehicle rear side around at least the first and second notches 220 and 222 as starting points, and the radar unit 142 can move back into the space 260 due to this deformation. Accordingly, the impact applied to the collision object not only from the front side with respect to the vehicle but also from diagonally above the vehicle can be reduced.

In the present invention, the radar unit 142 is fixed to the radar bracket 124 by fixing the positions near its four corners to the autobrake bracket 238, thus making it possible to reduce the number of components for attaching the radar unit 142.

Furthermore, in the present invention, the radar bracket 124 is provided so as to be disposed between the bumper member 120 and the hood lock member 122, thus making it easy to form the space 260. In addition, since the bumper member 120 and the hood lock member 122 are strong, it is possible to connect the strong members using the radar bracket 124, thus making it possible to improve vehicle rigidity.

Figure 8:
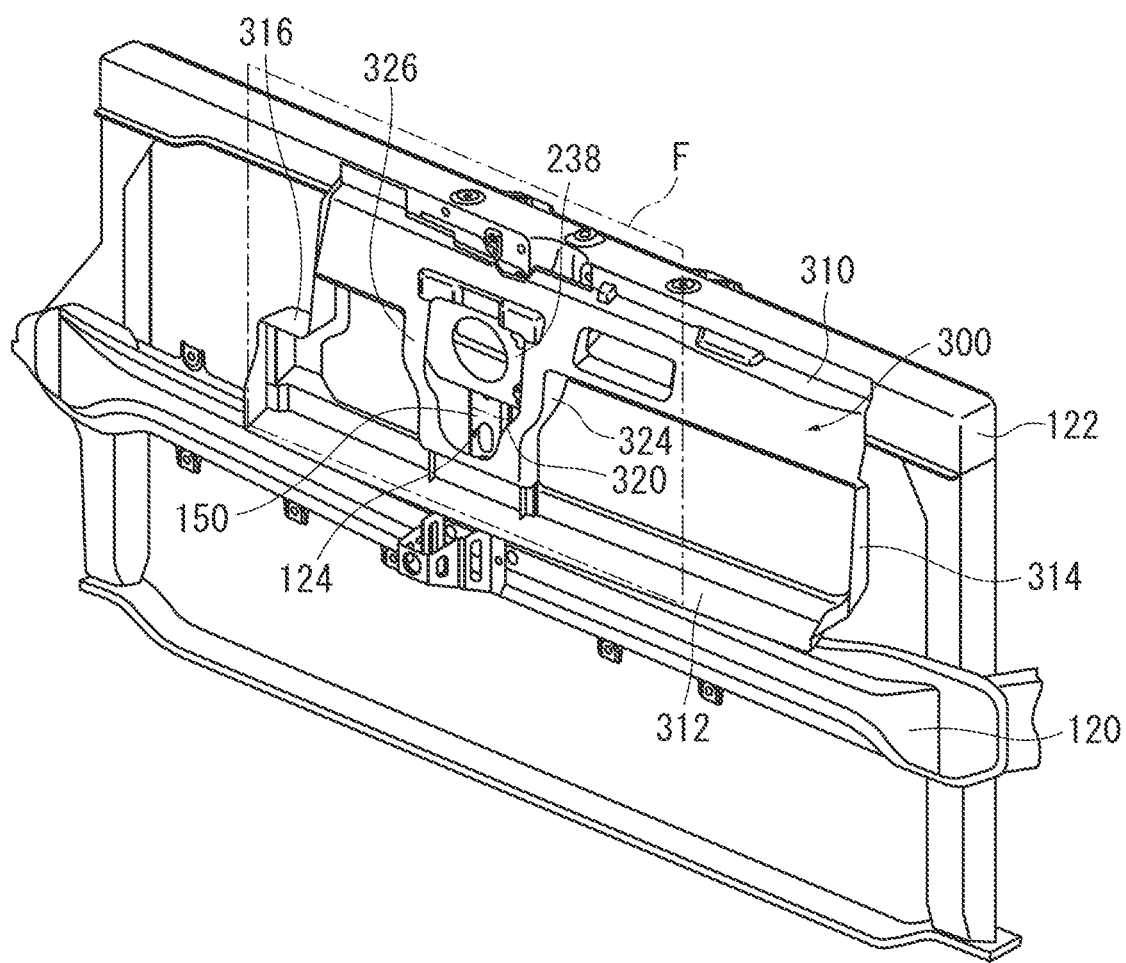
FIG. 8 is a schematic perspective view of an upper shroud that is a surrounding member provided near an upright portion of the radar bracket in FIG. 6.
Figure 9:
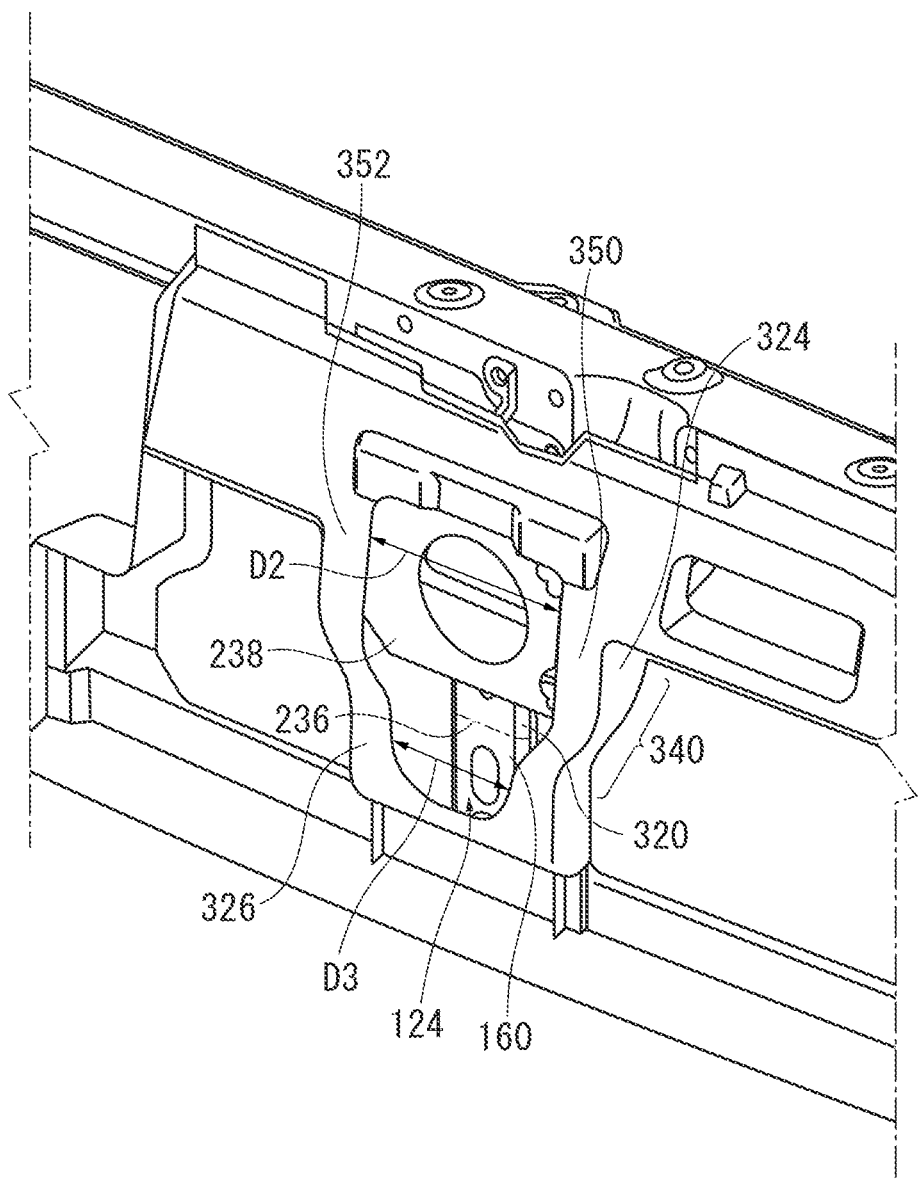
FIG. 9 is an enlarged view of a range F in FIG. 8.

It is preferable that another member exists parallel to and near the side surface of the radar bracket 124 in order to prevent the radar bracket 124 from being shifted in the vehicle width direction while moving back when an impact is applied from diagonally above. FIGS. 8 and 9 show an example. FIG. 8 is a schematic perspective view of an upper shroud 300 that is provided near the upright portion 150 of the radar bracket 124 in FIG. 6, and FIG. 9 is an enlarged view of a range F in FIG. 8.

The upper shroud 300 is a member surrounding the radar bracket 124 that is provided on the vehicle front side with respect to the radar bracket 124, and constitutes the upper portion of a shroud (its overall view is not shown) that effectively introduces headwind to a radiator (not shown). It should be noted that FIGS. 8 and 9 show a state in which the autobrake bracket 238 is fixed to the radar bracket 124 as an example.

The upper shroud 300 has outer walls 310, 312, 314 and 316 on its upper, lower, right and left sides. The upper end of the upper outer wall 310 is fixed to the hood lock member 122, and the lower end of the lower outer wall 312 is fixed to the bumper member 120. Furthermore, the upper shroud 300 has side walls 324 and a front wall 326 that connects the side walls 324 on the inner side with respect to the outer walls 310, 312, 314 and 316 near side surfaces 320 of the upright portion 150 of the radar bracket 124.

As shown in FIG. 9, the side walls 324 extend partially parallel to the side surfaces 320 of the shaft portion 160 of the radar bracket 124, and the portions parallel to the side surfaces 320 face the side surfaces 320 of the upright portion 150 of the radar bracket 124. The side walls 324 have bent portions 340 at positions corresponding to lower corners 356 and 358 (FIG. 5) of the radar unit body when the radar unit is fixed to the radar bracket 124, that is, at the position of the fifth boundary 236. The bent portions 340 have a gentle S shape (the side wall on the opposite side, which is not shown, has a mirrored S shape) corresponding to the lower corners 356 and 358 of the radar unit body 240. Accordingly, portions of the side walls 324 above the bent portions 340 are parallel to the side surfaces of the radar unit, the side walls 324 are bent toward the shaft portion 160 of the radar bracket 124 at the positions of the bent portions 340, and portions of the side walls 324 below the bent portions 340 are parallel to the side surfaces 320 of the shaft portion 160 of the radar bracket 124. Therefore, when the radar unit is fixed to the radar bracket 124, the lower corners 356 and 358 of the radar unit body are loosely covered with the bent portions 340.

The front wall 326 has a U shape, and the outer sides in the vehicle width direction of side portions 350 and 352 of the U shape are connected to the sides on the vehicle front side of the side walls 324, respectively. An internal dimension D2 of the upper portion of the front wall 326, that is, a distance between the side portions 350 and 352, is longer than the length D1 (FIG. 5) in the horizontal direction of the radar unit body. Accordingly, when the radar unit body is fixed to the autobrake bracket 238, the side portions 350 and 352 on the right and left sides of the front wall 326 are located near the side surfaces of the radar unit body and support the side surfaces of the radar unit body. This makes it possible to prevent the radar bracket 124 from moving back while being shifted in the vehicle width direction when an impact is applied in the diagonal direction.

In particular, in the present invention, since the side walls 324 have the bent portions 340, the front wall 326 is also bent along the bent portions 340, and thus the lower portion of the U shape is narrower than the upper portion of the U shape. Accordingly, an internal dimension D3 of the lower portion of the front wall 326 is shorter than the length D1 in the horizontal direction of the radar unit body. Therefore, when the radar unit body is fixed to the autobrake bracket 238, not only the side portions 350 and 352 on the right and left sides of the front wall 326 are located near the side surfaces of the radar unit body and support the side surfaces of the radar unit body but also the lower corners 356 and 358 of the radar unit body are loosely covered with the narrow lower portion of the U shape. This makes it possible to further prevent the radar bracket 124 from being shifted in the vehicle width direction while moving back when an impact is applied to the vehicle in the diagonal direction.

In another example, in the upper shroud 300, upper corners 360 and 362 (FIG. 5) of the radar unit body 240 may be covered with the front wall 326, for example, other than the bent portions 340 and the ends of the side portions 350 and 352.

Since the members 324, which are at least partially parallel to the side surfaces 320, are provided near the side surfaces 320 of the radar bracket 124 in this manner, these members make it possible to prevent the radar bracket 124 and the radar unit 142 from being shifted in the vehicle width direction while moving back when an impact is applied to the vehicle in the diagonal direction. In particular, since the gentle bent portions 340 are formed in the side walls 324 so as to correspond to the lower corners 356 and 358 (FIG. 5) of the radar unit body 240 when the radar unit 142 is attached to the radar bracket 124, it is possible to further prevent the radar bracket and the radar unit from being shifted in the vehicle width direction when an impact is applied in the diagonal direction.

While a preferred embodiment of the present invention has been described above with reference to the accompanying drawings, the above-described embodiment is a preferred example of the present invention, and other embodiments can be implemented or carried out by various methods. In particular, the present invention is not limited to the detailed shapes, sizes, configurations, layouts and the like of the components shown in the accompanying drawings unless otherwise specified herein. Also, the expressions and terms used herein are intended for illustrative purposes only, and are not restrictive unless otherwise specified.

Accordingly, it will be apparent for a person skilled in the art that various modifications and variations may be made within the scope of the invention as defined in the appended claims, and those modifications and variations should be understood to be included within the technical scope of the present invention.

The present invention can be used in a vehicle body front structure comprising a radar unit.

The invention claimed is:

1. A vehicle body front structure comprising a radar unit, further comprising:
    a bumper member that extends in a vehicle width direction on a rear side with respect to a front bumper and supports the front bumper;
    a hood lock member that is provided parallel to the bumper member on a vehicle rear side with respect to the bumper member above the bumper member, a hood lock being attached to the hood lock member; and a radar bracket that is disposed between the bumper member and the hood lock member, the radar unit being fixed to the radar bracket,
wherein the radar bracket includes:
an upright portion that is attached to the bumper member and extends upward from the bumper member, the radar unit being fixed to the upright portion;
an oblique portion that is continuous with an upper end of the upright portion, extends toward a vehicle rear side and upward, and is attached to the hood lock member;
a first deformation portion that is formed at a boundary between the upright portion and the oblique portion and facilitates a change in an angle between the upright portion and the oblique portion; and
a second deformation portion that is formed at a position of the oblique portion at which the oblique portion is attached to the hood lock member and facilitates a change in a direction in which the oblique portion extends from the hood lock member, and
wherein a space that can accommodate at least a portion of the radar unit is formed under the oblique portion on a rear side with respect to the upright portion.

2. The vehicle body front structure according to claim 1, wherein the radar bracket further includes:
a third deformation portion that is formed at a boundary between the bumper member and the upright portion and that facilitates a change in a direction in which the upright portion extends from the bumper member; and
a fourth deformation portion that is formed at a boundary between the upright portion and the radar unit and that facilitates deformation of the upright portion near the radar unit.

3. The vehicle body front structure according to claim 1, wherein:
the upright portion includes a shaft portion extending in a vertical direction and a lateral portion extending from an upper end of the shaft portion in a vehicle width direction, the upright portion having a T shape when viewed from a vehicle front side,
the oblique portion includes a first oblique portion extending toward a vehicle rear side and a vehicle upper side from one end of the lateral portion and a second oblique portion extending toward a vehicle rear side and a vehicle upper side from an opposite end of the lateral portion, and
the hood lock of the hood lock member is located between the first oblique portion and the second oblique portion above the radar unit.

4. The vehicle body front structure according to claim 1, wherein:
the upright portion includes a shaft portion extending in a vertical direction and a lateral portion extending from an upper end of the shaft portion in a vehicle width direction, the upright portion having a T shape when viewed from a vehicle front side,
the oblique portion includes a first oblique portion extending toward a vehicle rear side and a vehicle upper side from one end of the lateral portion and a second oblique portion extending toward a vehicle rear side and a vehicle upper side from an opposite end of the lateral portion, and
the hood lock of the hood lock member is located between the first oblique portion and the second oblique portion above the radar unit.

5. The vehicle body front structure according to claim 3, wherein:
the radar unit includes a radar unit body and an autobrake bracket for attaching the radar unit body to the radar bracket,
the autobrake bracket is fixed to the lateral portion at a first fixing point and a second fixing point, and
the first fixing point is provided on a central vertical line of a boundary between the first oblique portion and the lateral portion and the second fixing point is provided on a central vertical line of a boundary between the second oblique portion and the lateral portion.

6. The vehicle body front structure according to claim 4, wherein:
the radar unit includes a radar unit body and an autobrake bracket for attaching the radar unit body to the radar bracket,
the autobrake bracket is fixed to the lateral portion at a first fixing point and a second fixing point, and
the first fixing point is provided on a central vertical line of a boundary between the first oblique portion and the lateral portion and the second fixing point is provided on a central vertical line of a boundary between the second oblique portion and the lateral portion.

7. The vehicle body front structure according to claim 1, wherein at least one of the first deformation portion and the second deformation portion is a notch.

8. The vehicle body front structure according to claim 2, wherein at least one of the third deformation portion and the fourth deformation portion is a notch.

9. The vehicle body front structure according to claim 1, further comprising a surrounding member that is provided near the upright portion, wherein the surrounding member includes side walls that face both side surfaces of the upright portion, respectively.

10. The vehicle body front structure according to claim 2, further comprising a surrounding member that is provided near the upright portion, wherein the surrounding member includes side walls that face both side surfaces of the upright portion, respectively.

11. The vehicle body front structure according to claim 3, further comprising a surrounding member that is provided near the upright portion, wherein the surrounding member includes side walls that face both side surfaces of the upright portion, respectively.

12. The vehicle body front structure according to claim 4, further comprising a surrounding member that is provided near the upright portion, wherein the surrounding member includes side walls that face both side surfaces of the upright portion, respectively.

13. The vehicle body front structure according to claim 5, further comprising a surrounding member that is provided near the upright portion, wherein the surrounding member includes side walls that face both side surfaces of the upright portion, respectively.

14. The vehicle body front structure according to claim 6, further comprising a surrounding member that is provided near the upright portion, wherein the surrounding member includes side walls that face both side surfaces of the upright portion, respectively.

15. The vehicle body front structure according to claim 7, further comprising a surrounding member that is provided near the upright portion, wherein the surrounding member includes side walls that face both side surfaces of the upright portion, respectively.

16. The vehicle body front structure according to claim 8, further comprising a surrounding member that is provided near the upright portion, wherein the surrounding member includes side walls that face both side surfaces of the upright portion, respectively.

17. The vehicle body front structure according to claim 9, wherein:
   the surrounding member is a shroud that introduces headwind to a radiator, and
   the side walls have a bent portion that covers at least one corner of the radar unit.

18. The vehicle body front structure according to claim 10, wherein:
   the surrounding member is a shroud that introduces headwind to a radiator, and
   the side walls have a bent portion that covers at least one corner of the radar unit.

19. The vehicle body front structure according to claim 11, wherein:
   the surrounding member is a shroud that introduces headwind to a radiator, and
   the side walls have a bent portion that covers at least one corner of the radar unit.

20. The vehicle body front structure according to claim 12, wherein:
   the surrounding member is a shroud that introduces headwind to a radiator, and
   the side walls have a bent portion that covers at least one corner of the radar unit.

\* \* \* \* \*